(12) United States Patent
Ishida et al.

(10) Patent No.: US 8,486,578 B2
(45) Date of Patent: Jul. 16, 2013

(54) ELECTROLYTE MEMBRANE/ELECTRODE STRUCTURE AND FUEL CELL

(75) Inventors: Kentaro Ishida, Utsunomiya (JP);
Takeaki Isobe, Utsunomiya (JP);
Masaaki Nanaumi, Utsunomiya (JP);
Takeshi Matsubara, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 13/057,714

(22) PCT Filed: Jul. 22, 2009

(86) PCT No.: PCT/JP2009/063085
§ 371 (c)(1),
(2), (4) Date: Feb. 4, 2011

(87) PCT Pub. No.: WO2010/016384
PCT Pub. Date: Feb. 11, 2010

(65) Prior Publication Data
US 2011/0136038 A1    Jun. 9, 2011

(30) Foreign Application Priority Data
Aug. 4, 2008  (JP) ................................ 2008-200481

(51) Int. Cl.
*H01M 8/10* (2006.01)
*H01M 8/02* (2006.01)

(52) U.S. Cl.
USPC ............................ 429/480; 429/481; 429/483

(58) Field of Classification Search
USPC ......................................... 429/480, 481, 483
See application file for complete search history.

(56) References Cited

U.S. PATENT DOCUMENTS

| 7,195,838 | B2 | 3/2007 | Nanaumi et al. |
| 7,476,459 | B2 | 1/2009 | Wakahoi et al. |
| 8,192,896 | B2 * | 6/2012 | Yamauchi et al. ............. 429/508 |
| 2005/0100776 | A1 * | 5/2005 | Brunk et al. ..................... 429/35 |
| 2005/0142397 | A1 * | 6/2005 | Wakahoi et al. ................ 429/12 |

FOREIGN PATENT DOCUMENTS

| CA | 2359712 A1 | 4/2002 |
| EP | 1921701 A1 * | 5/2008 |
| JP | 5-21077 | 1/1993 |

(Continued)

OTHER PUBLICATIONS

International Search Report for Application No. PCT/JP2009/063085, dated Sep. 29, 2009.

(Continued)

*Primary Examiner* — Gregg Cantelmo
(74) *Attorney, Agent, or Firm* — Nelson Mullins Riley & Scarborough LLP; Anthony A. Laurentano

(57) ABSTRACT

An electrolyte membrane/electrode structure constituting a fuel cell comprises a solid polymer electrolyte membrane, an anode side electrode and a cathode side electrode sandwiching the solid polymer electrolyte membrane. The anode side electrode is provided with an electrode catalyst layer and a gas diffusion layer abutting on one side of the solid polymer electrolyte membrane and exposing the outer circumference thereof in the shape of a frame, and the cathode side electrode is provided with an electrode catalyst layer and a gas diffusion layer abutting on the other side of the solid polymer electrolyte membrane. A reinforcing sheet member is arranged on the frame-shaped surface of the solid polymer electrolyte membrane projecting from the outer circumference of the gas diffusion layer.

10 Claims, 4 Drawing Sheets

FOREIGN PATENT DOCUMENTS

| | | |
|---|---|---|
| JP | 10-154521 | 6/1998 |
| JP | 2003-68323 A | 3/2003 |
| JP | 2004-87505 | 3/2004 |
| JP | 2005-32607 | 2/2005 |
| JP | 2005-209605 | 8/2005 |
| JP | 2006338939 A * | 12/2006 |
| JP | 2007-66767 | 3/2007 |
| JP | 2007-214101 | 8/2007 |
| JP | 2008-171783 | 7/2008 |
| WO | WO 2008126350 A1 * | 10/2008 |

OTHER PUBLICATIONS

Canadian Office Action for Application for Application No. 2,732,724, 2 pages, dated Jun. 5, 2012.

Japanese Office Action for Application No. 2008-200481, 5 pages, dated Feb. 12, 2013

* cited by examiner

ELECTROLYTE MEMBRANE/ELECTRODE STRUCTURE AND FUEL CELL

RELATED APPLICATIONS

This application is a 35 U.S.C. 371 national stage filing of International Application No. PCT/JP2009/063085, filed Jul. 22, 2009, which claims priority to Japanese Patent Application No. 2008-200481 filed on Aug. 4, 2008 in Japan. The contents of the aforementioned applications are hereby incorporated by reference.

TECHNICAL FIELD

The present invention relates to a membrane electrode assembly (electrolyte membrane/electrode structure) including a first electrode and a second electrode, and a solid polymer electrolyte membrane interposed between the first electrode and the second electrode. Also, the present invention relates to a fuel cell including the membrane electrode assembly and first and second separators sandwiching the membrane electrode assembly.

BACKGROUND ART

Generally, a solid polymer electrolyte fuel cell employs a solid polymer electrolyte membrane. The solid polymer electrolyte membrane is a polymer ion exchange membrane. The solid polymer electrolyte membrane is interposed between an anode and a cathode each including a catalyst layer (electrode catalyst) and a gas diffusion layer (porous carbon) to form a membrane electrode assembly (MEA). The membrane electrode assembly is interposed between separators (bipolar plates) to form the fuel cell. Normally, in use, predetermined numbers of the fuel cells and the separators are stacked together to form a fuel cell stack.

In the membrane electrode assembly, a solid polymer electrolyte membrane in the form of a thin film is used. Therefore, it is required to prevent damage of the solid polymer electrolyte membrane caused by differential pressure of reactant gases or mechanical stress applied to the solid polymer electrolyte membrane.

In this regard, for example, a sealing structure of a solid polymer electrolyte fuel cell disclosed in Japanese Laid-Open Patent Publication No. 05-021077 is known. As shown in FIG. 4, a solid polymer electrolyte membrane 1 is interposed between an anode 2 and a cathode 3. A separator 4 having a fuel gas channel 4a is disposed on the anode 2, and a separator 5 having an oxygen-containing gas channel 5a is disposed on the cathode 3.

Protective membranes 6 comprised of frame-shaped fluorine-resin sheets are inserted on both surfaces at the outer circumferential ends of the solid polymer electrolyte membrane 1. When the solid polymer electrolyte membrane 1, the anode 2 and the cathode 3 are combined together by thermal compression bonding process, the protective membranes 6 are formed integrally therewith. Gas seal members 7 are inserted between the separators 4, 5 around the anode 2 and the cathode 3 like frames of the anode 2 and the cathode 3.

SUMMARY OF INVENTION

However, in Japanese Laid-Open Patent Publication No. 05-021077, since the protective membrane 6 is made of a thin film sheet having a thickness of 50 μm or less, when the solid polymer electrolyte membrane 1 is sandwiched between the gas seal members 7, the sufficient strength cannot be obtained. In particular, when the gas seal members 7 like ribs are used as gaskets, a shearing force may be applied to the solid polymer electrolyte membrane 1 easily due to positional displacement of the ribs facing each other or the like. Thus, the outer marginal portion of the solid polymer electrolyte membrane 1 to which the protective membranes 6 are attached may be deformed, the solid polymer electrolyte membrane 1 may be damaged, and the sealing performance may be lowered disadvantageously.

The present invention has been made to solve the problems of this type, and an object of the present invention is to provide a membrane electrode assembly and a fuel cell which make it possible to reduce in thickness easily, prevent damage of the solid polymer electrolyte membrane as much as possible, and maintain a desired power generation performance.

The present invention relates to a membrane electrode assembly including a first electrode, a second electrode, and a solid polymer electrolyte membrane interposed between the first electrode and the second electrode. The surface area of the second electrode is larger than the surface area of the first electrode.

The first electrode includes a first catalyst layer and a first gas diffusion layer. The first catalyst layer contacts one surface of the solid polymer electrolyte membrane while allowing an outer circumference of the solid polymer electrolyte membrane in a frame shape to be exposed. The second electrode includes a second catalyst layer and a second gas diffusion layer. The second catalyst layer contacts the other surface of the solid polymer electrolyte membrane.

The plane of the second gas diffusion layer is larger than the plane of the first gas diffusion layer, and a reinforcement sheet member is provided on a frame-shaped surface of the solid polymer electrolyte membrane, the frame-shaped surface extending outwardly from an outer circumferential end of the first gas diffusion layer.

Further, the present invention relates to a fuel cell having a membrane electrode assembly and first and second separators sandwiching the membrane electrode assembly. The membrane electrode assembly includes a first electrode, a second electrode, and a solid polymer electrolyte membrane interposed between the first electrode and the second electrode. The surface area of the second electrode is larger than the surface area of the first electrode.

The first electrode includes a first catalyst layer and a first gas diffusion layer. The first catalyst layer contacts one surface of the solid polymer electrolyte membrane while allowing an outer circumference of the solid polymer electrolyte membrane in a frame shape to be exposed. The second electrode includes a second catalyst layer and a second gas diffusion layer. The second catalyst layer contacts the other surface of the solid polymer electrolyte membrane.

The plane of the second gas diffusion layer is larger than the plane of the first gas diffusion layer, and a reinforcement sheet member is provided on a frame-shaped surface of the solid polymer electrolyte membrane, the frame-shaped surface extending outwardly from an outer circumferential end of the first gas diffusion layer. A first ridge seal is interposed between the reinforcement sheet member and the first separator, and a second ridge seal is interposed between the first separator and the second separator.

In the present invention, the first electrode and the second electrode having different surface areas are provided on both surfaces of the solid polymer electrolyte membrane to form the membrane electrode assembly, and in the membrane electrode assembly of this type, so-called "stepped-type MEA", the reinforcement sheet member is provided on the frame shaped surface exposed from the outer circumferential end of the first electrode of the solid polymer electrolyte membrane. Improvement in the strength of the outer circumferential portion of the stepped-type MEA is achieved, and it becomes possible to prevent damage of the solid polymer electrolyte membrane as much as possible.

Further, since the membrane electrode assembly is a stepped-type MEA, no shearing force is generated in the outer circumferential portion of the stepped-type MEA due to seal displacement. Accordingly, the desired sealing performance and the desired durability can be achieved advantageously.

DESCRIPTION OF EMBODIMENTS

Figure 1:
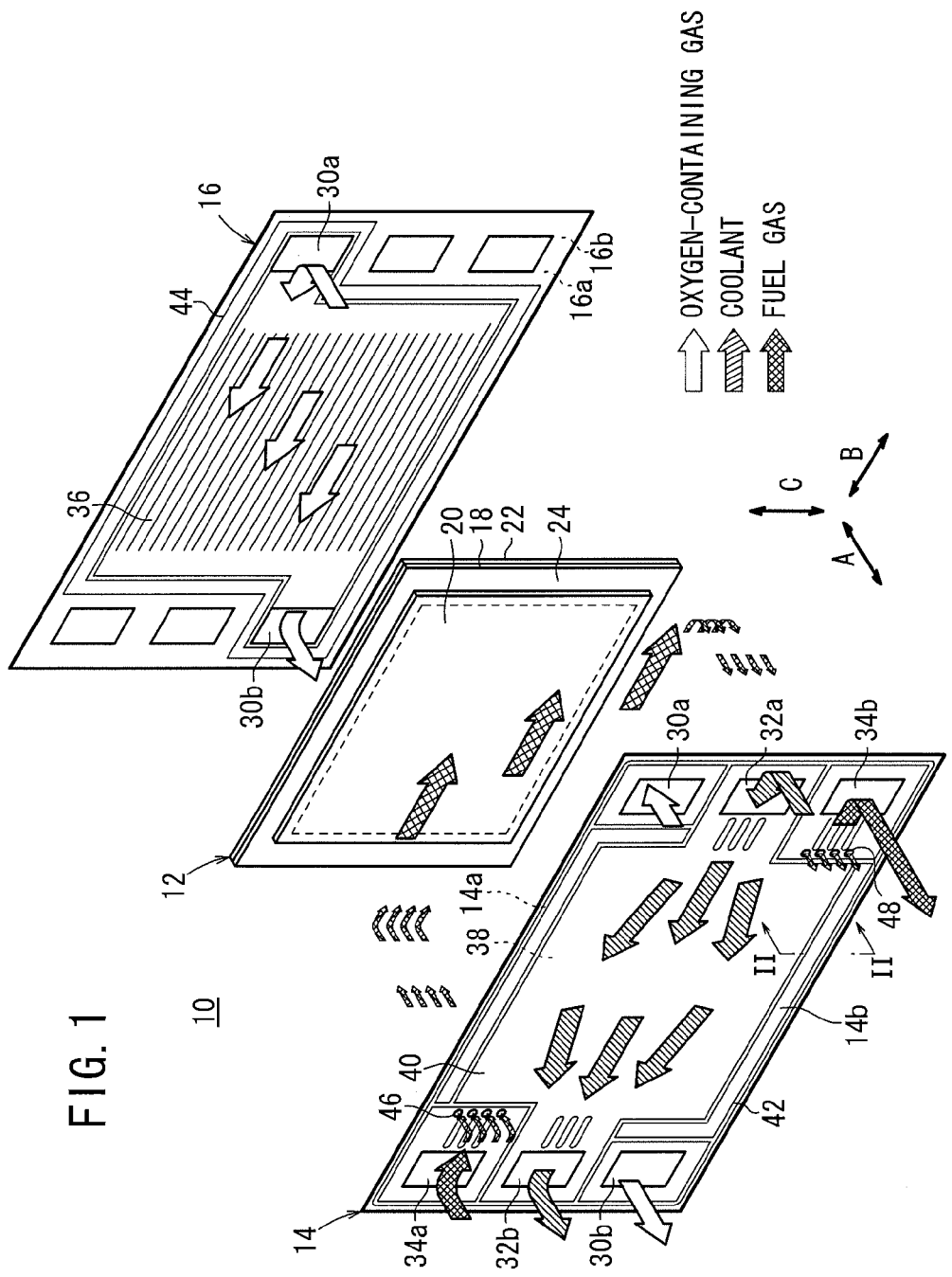
FIG. 1 is an exploded perspective view showing main components of a fuel cell according to an embodiment of the present invention.
Figure 2:
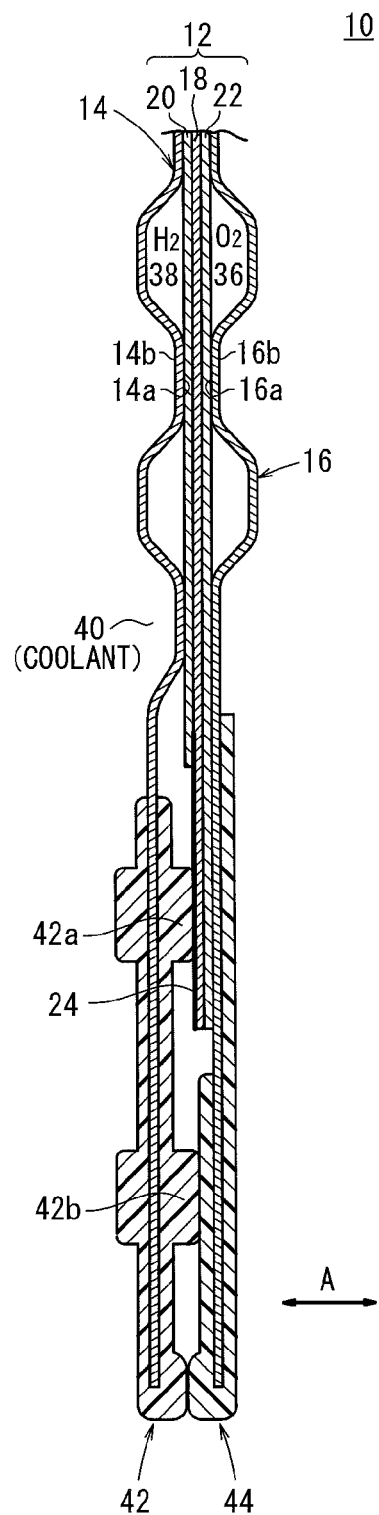
FIG. 2 is a cross sectional view showing the fuel cell, taken along a line II-II in FIG. 1.

As shown in FIGS. 1 and 2, a fuel cell 10 according to an embodiment of the present invention includes a membrane electrode assembly 12 according to the present embodiment and first and second separators 14, 16 sandwiching the membrane electrode assembly 12. For example, the first and second separators 14, 16 are steel plates, stainless steel plates, aluminum plates, plated steel sheets, or metal plates having anti-corrosive surfaces formed by surface treatment. Alternatively, the first and second separators 14, 16 are made of carbon material or the like.

The membrane electrode assembly 12 includes a solid polymer electrolyte membrane 18, an anode (first electrode) 20 and a cathode (second electrode) 22 sandwiching the solid polymer electrolyte membrane 18. The surface area of the anode 20 is smaller than the surface area of the cathode 22. A reinforcement sheet member 24 is provided on a frame-shaped surface of the solid polymer electrolyte membrane 18 exposed to the outside from an area around the anode 20.

Figure 3:
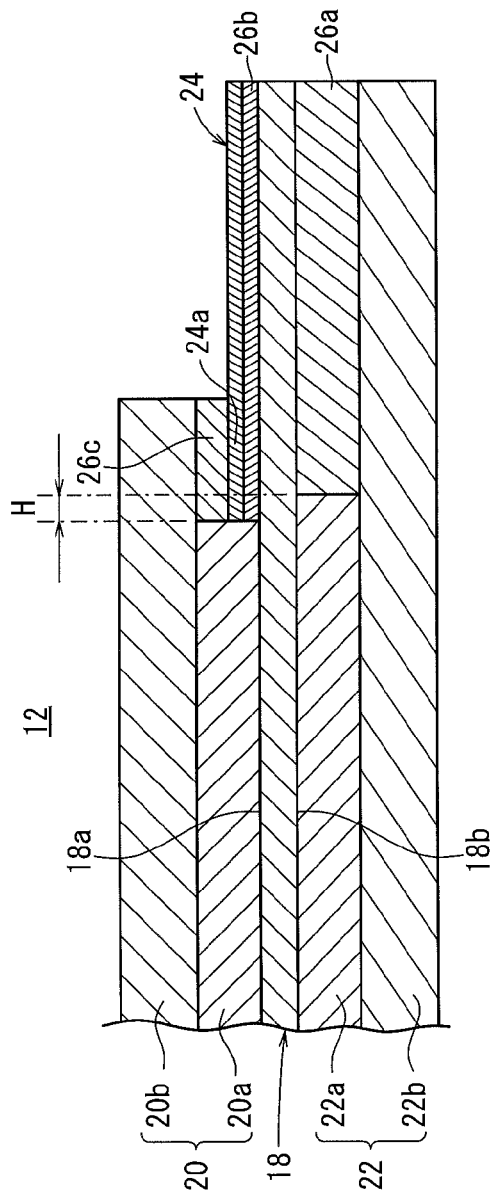
FIG. 3 is a partial cross sectional view showing a membrane electrode assembly of the fuel cell.
Figure 4:
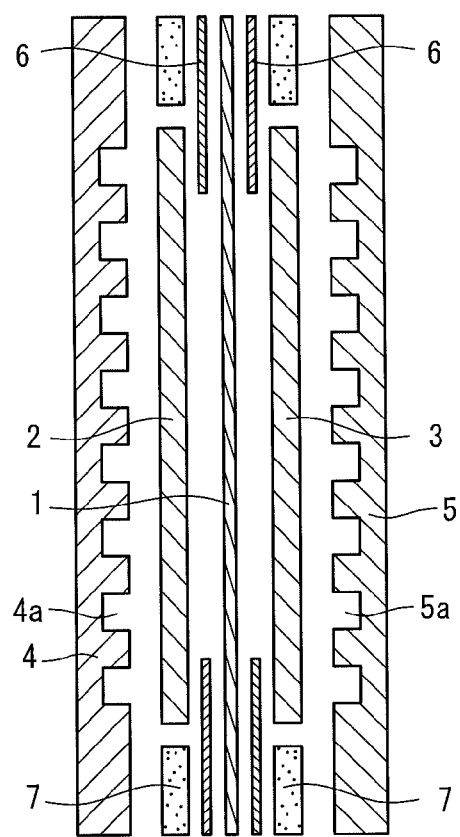
FIG. 4 is an explanatory view showing a seal structure disclosed in Japanese Laid-Open Patent Publication No. 05-021077.

As shown in FIG. 3, the anode 20 includes an electrode catalyst layer (first catalyst layer) 20a that contacts one surface 18a of the solid polymer electrolyte membrane 18, and a gas diffusion layer (first gas diffusion layer) 20b. A frame-shaped outer circumferential portion of the solid polymer electrolyte membrane 18 around the electrode catalyst layer 20a is exposed to the outside. The cathode 22 includes an electrode catalyst layer (second catalyst layer) 22a contacting the other surface 18b of the solid polymer electrolyte membrane 18 and a gas diffusion layer (second gas diffusion layer) 22b. Each of the electrode catalyst layers 20a, 22a may include a plurality of layers.

The plane of the gas diffusion layer 22b is larger than the plane of the gas diffusion layer 20b. The gas diffusion layer 22b protrudes from the outer circumferential end of the electrode catalyst layer 22a, and covers the entire other surface 18b of the solid polymer electrolyte membrane 18.

An adhesive layer 26a is provided between the gas diffusion layer 22b protruding from the outer circumferential end of the electrode catalyst layer 22a and the solid polymer electrolyte membrane 18. For example, fluorine based adhesive is used for the adhesive layer 26a. The gas diffusion layer 20b protrudes from the outer circumferential end of the electrode catalyst layer 20a, and an overlapping portion 24a is provided at an inner circumferential side of the reinforcement sheet member 24. The overlapping portion 24a is interposed between the gas diffusion layer 20b protruding from the outer circumferential end of the electrode catalyst layer 20a and the solid polymer electrolyte membrane 18.

The reinforcement sheet member 24 has a frame shape, and is made of engineering plastic or super engineering plastic such as PPS (polyphenylene sulfide resin) or PEEK-based (polyetheretherketone) material.

An adhesive layer 26b is provided between the reinforcement sheet member 24 and the solid polymer electrolyte membrane 18. In the overlapping portion 24a, an adhesive layer 26c is provided between the reinforcement sheet member 24 and the gas diffusion layer 20b. The total thickness of the reinforcement sheet member 24, the adhesive layer 26b and the adhesive layer 26c is equal to the thickness of the electrode catalyst layer 20a. It should be noted that the adhesive layer 26c may be impregnated into the gas diffusion layer 20b for preventing gas leakage through the end of the gas diffusion layer 20b.

An inner circumferential edge of the adhesive layer 26a contacts an outer circumferential edge of the electrode catalyst layer 22a without any gap. Inner circumferential edges of the adhesive layers 26b, 26c contact an outer circumferential edge of the electrode catalyst layer 20a without any gap. The inner circumferential end of the adhesive layer 26a is positioned outwardly from the inner circumferential end of the adhesive layer 26c (and 26b) by the distance H over the entire circumference in a surface direction of the solid polymer electrolyte membrane 18. Each of the electrode catalyst layers 20a, 22a includes platinum particles supported on porous carbon particles. The platinum particles are applied onto both surfaces of the solid polymer electrolyte membrane 18 to form the electrode catalyst layers 20a, 22a.

As shown in FIG. 1, at one end of the fuel cell 10 in a horizontal direction indicated by an arrow B in FIG. 1, an oxygen-containing gas supply passage 30a for supplying an oxygen-containing gas, a coolant supply passage 32a for supplying a coolant, and a fuel gas discharge passage 34b for discharging a fuel gas such as a hydrogen-containing gas are arranged in a vertical direction indicated by an arrow C. The oxygen-containing gas supply passage 30a, the coolant supply passage 32a, and the fuel gas discharge passage 34b extend through the fuel cell 10 in the direction indicated by the arrow A.

At the other end of the fuel cell 10 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are arranged in the direction indicated by the arrow C. The fuel gas supply passage 34a, the coolant discharge passage 32b, and the oxygen-containing gas discharge passage 30b extend through the fuel cell 10 in the direction indicated by the arrow A.

The second separator 16 has an oxygen-containing gas flow field 36 on its surface 16a facing the membrane electrode assembly 12. The oxygen-containing gas flow field 36 is connected between the oxygen-containing gas supply passage 30a and the oxygen-containing gas discharge passage 30b.

The first separator 14 has a fuel gas flow field 38 on its surface 14a facing the membrane electrode assembly 12. The fuel gas flow field 38 is connected between the fuel gas supply passage 34a and the fuel gas discharge passage 34b. A coolant flow field 40 is formed between a surface 14b of the first separator 14 and a surface 16b of the second separator 16. The coolant flow field 40 is connected between the coolant supply passage 32a and the coolant discharge passage 32b.

As shown in FIGS. 1 and 2, a first seal member 42 is formed integrally with the surfaces 14a, 14b of the first separator 14, around the outer circumferential end of the first separator 14. Further, a second seal member 44 is formed integrally with the surfaces 16a, 16b of the second separator 16, around the outer circumferential end of the second separator 16.

As shown in FIG. 2, the first seal member 42 includes a first ridge seal 42a interposed between the reinforcement sheet member 24 and the first separator 14, and a second ridge seal 42b interposed between the first separator 14 and the second separator 16. The second seal member 44 is a flat seal. Instead of providing the first seal member 42 with the second ridge seal 42b, the second seal member 44 may include a second ridge seal (not shown).

Each of the first and second seal members 42, 44 is made of seal material, cushion material, or packing material such as an EPDM, an NBR, a fluoro rubber, a silicone rubber, a fluorosilicone rubber, a butyl rubber, a natural rubber, a styrene rubber, a chloroprene rubber, or an acrylic rubber.

As shown in FIG. 1, the first separator 14 has supply holes 46 connecting the fuel gas supply passage 34a to the fuel gas flow field 38, and discharge holes 48 connecting the fuel gas flow field 38 to the fuel gas discharge passage 34b.

Operation of the fuel cell 10 including the membrane electrode assembly 12 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, oil, etc. is supplied to the coolant supply passage 32a.

In the structure, the oxygen-containing gas from the oxygen-containing gas supply passage 30a is supplied to the oxygen-containing gas flow field 36 of the second separator 16, and flows in the direction indicated by the arrow B, and then the oxygen-containing gas is supplied to the cathode 22 of the membrane electrode assembly 12. The fuel gas from the fuel gas supply passage 34a flows through the supply holes 46 into the fuel gas flow field 38. The fuel gas flows along the fuel gas flow field 38 in the direction indicated by the arrow B, and the fuel gas is supplied to the anode 20 of the membrane electrode assembly 12.

Thus, in each of the membrane electrode assemblies 12, the oxygen-containing gas supplied to the cathode 22 and the fuel gas supplied to the anode 20 are consumed in the electrochemical reactions at the electrode catalyst layers of the cathode 22 and the anode 20 for generating electricity.

Then, the oxygen-containing gas consumed at the cathode 22 is discharged in the direction indicated by the arrow A along the oxygen-containing gas discharge passage 30b. Likewise, the fuel gas after partially consumed at the anode 20 flows through the discharge holes 48, and the fuel gas is discharged in the direction indicated by the arrow A along the fuel gas discharge passage 34b.

Further, the coolant supplied to the coolant supply passage 32a flows into the coolant flow field 40 between the first separator 14 and the second separator 16, and then flows in the direction indicated by the arrow B. After the coolant cools the membrane electrode assembly 12, the coolant is discharged through the coolant discharge passage 32b.

In the present embodiment, the anode 20 and the cathode 22 having different surface areas are provided on both surfaces of the solid polymer electrolyte membrane 18. In the membrane electrode assembly (MEA) 12 having the structure of this type, so-called "stepped-type MEA", the reinforcement sheet member 24 is provided on the frame-shaped surface of the solid polymer electrolyte membrane 18 which is exposed on the anode 20 side.

In the structure, improvement in the strength in the outer circumferential portion of the membrane electrode assembly 12 is achieved, and it becomes possible to prevent damage of the solid polymer electrolyte membrane 18 as much as possible advantageously. Further, since the other surface 18b of the solid polymer electrolyte membrane 18 is supported by the gas diffusion layer 22b serving as the second gas diffusion layer, it is sufficient to provide the reinforcement sheet member 24 only on the one surface 18a of the solid polymer electrolyte membrane 18.

Further, the first seal member 42 includes the first ridge seal 42a interposed between the reinforcement sheet member 24 and the first separator 14, and the second ridge seal 42b interposed between the first separator 14 and the second separator 16 (see FIG. 2). Therefore, in the membrane electrode assembly 12, the desired sealing performance and the desired durability are achieved without generation of any shearing force due to the positional displacement of the seals or the like.

Further, at the anode 20, as shown in FIG. 3, the reinforcement sheet member 24 is adhered to the solid polymer electrolyte membrane 18, and the electrode catalyst layer 20a and the gas diffusion layer 20b are adhered to the reinforcement sheet member 24. Moreover, the outer circumferential edge of the electrode catalyst layer 20a contacts the inner circumferential edges of the adhesive layers 26b, 26c and the inner circumferential edge of the reinforcement sheet member 24 without any gap. In the structure, the anode 20 is fixed to the solid reinforcement sheet member 24, and improvement in the adhesion performance is achieved easily.

Further, the inner circumferential end of the reinforcement sheet member 24 has the overlapping portion 24a which extends inward from the outer circumferential end of the gas diffusion layer 20b to contact the outer circumferential end of the electrode catalyst layer 20a. In the structure, the solid polymer electrolyte membrane 18 is reinforced reliably over the entire surface other than the power generation area (other than the electrode catalyst layer 20a), and improvement in the durability of the solid polymer electrolyte membrane 18 is achieved.

Further, the inner circumferential end of the adhesive layer 26c of the anode 20 and the inner circumferential end of the adhesive layer 26a of the cathode 22 are shifted from each other with respect to the stacking direction indicated by the arrow A. More specifically, the inner circumferential end of the adhesive layer 26a is positioned outwardly from the inner circumferential end of the adhesive layer 26c by the distance H over the entire circumference in the surface direction of the solid polymer electrolyte membrane 18. Thus, it becomes possible to prevent stress concentration suitably. Further, the inner circumferential end of the adhesive layer 26a may be positioned inwardly from the inner circumferential end of the adhesive layer 26c by the distance H over the entire circumference in the surface direction of the solid polymer electrolyte membrane 18.

Further, the reinforcement sheet member 24 is made of engineering plastic or super engineering plastic. Therefore, it is possible to prevent degradation of the solid polymer electrolyte membrane 18 under the high temperature or high humidification environment at the time of operating the fuel cell 10 and also prevent deformation of the solid polymer electrolyte membrane 18 due to the sealing pressure.

The invention claimed is:

1. A membrane electrode assembly including a first electrode, a second electrode, and a solid polymer electrolyte membrane interposed between the first electrode and the second electrode, a surface area of the second electrode being larger than a surface area of the first electrode, the first electrode including a first catalyst layer and a first gas diffusion layer, the first catalyst layer contacting one surface of the solid polymer electrolyte membrane while allowing an outer circumference of the solid polymer electrolyte membrane in a frame shape to be exposed, the second electrode including a second catalyst layer and a second gas diffusion layer, the second catalyst layer contacting the other surface of the solid polymer electrolyte membrane, wherein a plane of the second gas diffusion layer is larger than a plane of the first gas diffusion layer; and a reinforcement sheet member is provided only on one side of a frame-shaped surface of the solid polymer electrolyte membrane, the frame-shaped surface extending outwardly from an outer circumferential end of the first gas diffusion layer, and wherein a surface of the reinforcement sheet member disposed opposite to the solid polymer electrolyte membrane is uncovered, wherein the second gas diffusion layer protrudes from an outer circumferential end of the second catalyst layer to cover the other surface of the solid polymer electrolyte membrane, and an adhesive layer is provided between the second gas diffusion layer protruding from the outer circumferential end of the second catalyst layer and the solid polymer electrolyte membrane.

2. The membrane electrode assembly according to claim 1, wherein the first gas diffusion layer protrudes from an outer circumferential end of the first catalyst layer; and the reinforcement sheet member has an overlapping portion at an inner circumferential edge thereof, and the overlapping portion is interposed between the first gas diffusion layer protruding from the outer circumferential end of the first catalyst layer and the solid polymer electrolyte membrane.

3. The membrane electrode assembly according to claim 2, wherein at the overlapping portion, an adhesive layer is provided between the reinforcement sheet member and the first gas diffusion layer.

4. The membrane electrode assembly according to claim 3, wherein an adhesive layer is provided between the reinforcement sheet member and the solid polymer electrolyte membrane.

5. The membrane electrode assembly according to claim 4, wherein the total thickness of the reinforcement sheet member and the adhesive layers provided on both sides of the reinforcement sheet member is equal to the thickness of the first catalyst layer.

6. The membrane electrode assembly according to claim 5, wherein the inner circumferential ends of the adhesive layers of the first electrode and the inner circumferential end of the adhesive layer of the second electrode are positioned respectively at different positions in a surface direction of the solid polymer electrolyte membrane.

7. The membrane electrode assembly according to claim 6, wherein the inner circumferential end of the adhesive layer of the second electrode is positioned outside the inner circumferential ends of the adhesive layers of the first electrode.

8. The membrane electrode assembly according to claim 1, wherein the outer circumferential edge of the second catalyst layer at least contacts the inner circumferential edge of the adhesive layer of the second electrode.

9. The membrane electrode assembly according to claim 4, wherein the outer circumferential edge of the first catalyst layer contacts inner circumferential edges of the adhesive layers of the first electrode and the inner circumferential edge of the reinforcement sheet member.

10. A fuel cell having a membrane electrode assembly and first and second separators sandwiching the membrane electrode assembly, the membrane electrode assembly including a first electrode, a second electrode, and a solid polymer electrolyte membrane interposed between the first electrode and the second electrode, a surface area of the second electrode being larger than a surface area of the first electrode, the first electrode including a first catalyst layer and a first gas diffusion layer, the first catalyst layer contacting one surface of the solid polymer electrolyte membrane while allowing an outer circumference of the solid polymer electrolyte membrane in a frame shape to be exposed, the second electrode including a second catalyst layer and a second gas diffusion layer, the second catalyst layer contacting the other surface of the solid polymer electrolyte membrane, wherein a plane of the second gas diffusion layer is larger than a plane of the first gas diffusion layer; and a reinforcement sheet member is provided only on one side of a frame-shaped surface of the solid polymer electrolyte membrane, the frame-shaped surface extending outwardly from an outer circumferential end of the first gas diffusion layer, wherein a surface of the reinforcement sheet member disposed opposite to the solid polymer electrolyte membrane is uncovered, wherein the second gas diffusion layer protrudes from an outer circumferential end of the second catalyst layer to cover the other surface of the solid polymer electrolyte membrane, an adhesive layer is provided between the second gas diffusion layer protruding from the outer circumferential end of the second catalyst layer and the solid polymer electrolyte membrane;

a first ridge seal is interposed between the reinforcement sheet member and the first separator; and a second ridge seal is interposed between the first separator and the second separator, wherein the first and second ridge seals are connected to the first separator.

* * * * *